(12) United States Patent
Eun et al.

(10) Patent No.: US 9,665,808 B2
(45) Date of Patent: May 30, 2017

(54) PRINTING METHOD FOR COMPENSATING FOR CHARACTER SIZE ACCORDING TO POSITION, AND PRINTED MATTER PRINTED BY THIS PRINTING METHOD

(71) Applicants: Ik Soo Eun, Seoul (KR); Myung Jin Eun, Seoul (KR)

(72) Inventors: Ik Soo Eun, Seoul (KR); Myung Jin Eun, Seoul (KR)

( * ) Notice: Subject to any disclaimer, the term of this patent is extended or adjusted under 35 U.S.C. 154(b) by 0 days.

(21) Appl. No.: 14/759,842

(22) PCT Filed: Dec. 31, 2013

(86) PCT No.: PCT/KR2013/012428
§ 371 (c)(1),
(2) Date: Jul. 8, 2015

(87) PCT Pub. No.: WO2014/109503
PCT Pub. Date: Jul. 17, 2014

(65) Prior Publication Data
US 2015/0356386 A1    Dec. 10, 2015

(30) Foreign Application Priority Data

Jan. 11, 2013   (KR) ........................ 10-2013-0003672

(51) Int. Cl.
*G06F 3/12* (2006.01)
*G06K 15/02* (2006.01)
*B41M 1/02* (2006.01)

(52) U.S. Cl.
CPC ........... *G06K 15/1868* (2013.01); *B41M 1/02* (2013.01); *G06K 15/1848* (2013.01)

(58) Field of Classification Search
None
See application file for complete search history.

(56) References Cited

U.S. PATENT DOCUMENTS

2005/0174587 A1 * 8/2005 Hara .................. G06K 15/1848
358/1.9

FOREIGN PATENT DOCUMENTS

| JP | H07-078140 | 3/1995 |
| JP | H09-127925 | 5/1997 |

(Continued)

OTHER PUBLICATIONS

Texblog http://texblog.org/2012/08/29/changing-the-font-size-in-latex/ (Aug. 2012).*

(Continued)

*Primary Examiner* — Huo Long Chen
(74) *Attorney, Agent, or Firm* — Roberts Mlotkowski Safran Cole & Calderon P.C.

(57) ABSTRACT

A printing method is provided, in which character sizes are enlarged gradually as going from a lower portion to an upper portion of a printing surface which may be a page of a book or an article region on which an article of a newspaper is printed. The longitudinal size (height) of characters at a lowest portion in each page of the book or in the article region is k times larger than a longitudinal size of characters at a highest portion, and wherein a value of k is about 1.28~1.79. The horizontal size (width) of characters at the lowest portion in each page of the book or in the article region is k' times larger than a longitudinal size of characters at a highest portion, and wherein a value of k' is about 0.7~1.0 times larger than the k.

2 Claims, 6 Drawing Sheets

(56) References Cited

FOREIGN PATENT DOCUMENTS

| | | |
|---|---|---|
| KR | 07-078140 | 3/1995 |
| KR | 09-127925 | 5/1997 |
| KR | 100731347 | 6/2007 |
| KR | 10-20090023917 | 3/2009 |
| KR | 1020090052391 | 5/2009 |

OTHER PUBLICATIONS

International Search Report PCT/KR2013/012428 dated Mar. 24, 2014.
International Search Report PCT/KR2013/012428 dated Mar. 24, 2013.

* cited by examiner

Before conversion

Higher portion →

사카이는 그 말을 하고는 울쩍 계단 아래로 내려갔다. 순간 혼마는 그의 팔을 잡으려고 손을 뻗었으나 그가 오른손으로 계단 손잡이를 꼭 잡고 있는 것을 보고 도중에 멈췄다.

사카이는 한 계단만 내려갔다. 그건 사고 당시 쇼코 어머니의 어두운 심리 상태의 어느 한 단계만큼만 내려갔다는 생각이 들게 했다.

"세키네 부인은 타가와에 올 때마다, 다들 위험하니까 그만두라고 하는데도 이 계단을 내려갔다는군요. 그건 말입니다. 이렇게

Same character size ↕

몇 번이고 내려가다 보면 어젠가 발이 미끄러지든가 균형을 잘못 잡아 떨어져 죽을 수 있지 않을까, 그렇게 되면 좋겠는데....." 그렇게 생각했기 때문일 겁니다."

"그 정도로........."

혼마가 입을 열자 냉기가 안으로 스며들었다.

"그 정도로 고독했을까요?"

"그랬을 거예요. 전 그렇게 생각합니다."

사카이는 그렇게 말하고는 혼마 쪽으로 등을 돌린 채 뒷걸음질쳐서 3층 복도로 올라왔다.

"죽기 전까지 아주머니는 몇 번이고 이 계단을 내려갔어요. 그녀가 취했는데도 이 계단을 사용하는 걸 타가와에 오는 손님들은 다 알고 있었습니다. 그렇지만 그 손님들 중에서 만취해서 가게 문을나서는 아주머니를 누구 하나 엘리베이터까지 배웅해 주는

Lower portion →

After conversion

Higher portion →

사카이는 그 말을 하고는 울쩍 계단 아래로 내려 갔다. 순간 혼마는 그의 팔을 잡으려고 손을 뻗었으나 그가 오른손으로 계단 잡이를 꼭 잡고 있는 것을 보고 도중에 멈췄다.

사카이는 한 계단 만 내려 갔다. 그건 사고 당시 쇼코 어머니의 어두운 심리 상태의 어느한 단계만큼만 내려갔다는 생각이 들게 했다.

"세키네 부인은 타가와에 올 때마다, 다들 위험하니까 그만두라고 하는데도 이 계단을 내려갔다는군요. 그건 말입니다. 이렇게 몇번이고 내려가다 보면 어젠가 발이 미끄러지든가 균형을 잘못 잡아 떨어져 죽을 수 있지 않을까, 그렇게 되면 좋겠는데....." 그렇게 생각했기 때문일 겁니다."

↑ Enlarge character size

"그 정도로........."

혼마가 입을 열자 냉기가 안으로 스며들었다.

"그 정도로 고독했을까요?"

"그랬을 거예요. 전 그렇게 생각합니다."

사카이는 그렇게 말 하고는 혼마 쪽 으로 등을 돌린 채 뒷걸음질 쳐서 3층 복도로 올라왔다.

"죽기 전 까지 아주머니는 몇 번 이고 이 계단을 내려 갔어요. 그녀가 취했는데도 이계단을 사용하는 걸 타가와에 오는 손님들은 다 알고 있었습니다. 그렇지만 그 손남들 중에서 만취 해서 가게 문을 나서는 아주머니를 누구 하나 엘리베이터까지 배웅 해주는 사람은 없었어요. 그냥 놔두면 그녀는 또 그 계단을 내려갈 텐데

Lower portion →

PRINTING METHOD FOR COMPENSATING FOR CHARACTER SIZE ACCORDING TO POSITION, AND PRINTED MATTER PRINTED BY THIS PRINTING METHOD

FIELD OF INVENTION

The invention is related to a printing technology of font, more specifically to a printing method enabling readers to read well and more comfortably a book, newspaper, e-book, etc. that are put on a horizontal surface.

BACKGROUND TECHNOLOGY

Figure 1:
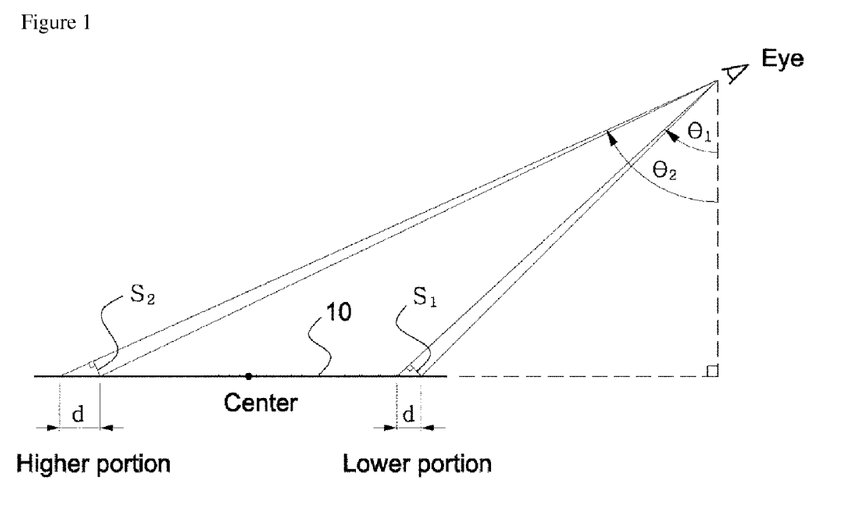
FIG. 1 is a diagram showing how characters of a top portion of a book look smaller than characters of a bottom portion when viewing diagonally a conventional book having character sizes all the same regardless of position.

When people read a book or newspaper, they usually put the printing on a desk having a surface parallel to a horizontal plane. FIG. 1 shows that a person views obliquely a printing put on a horizontal plane. When the person views the printing in an oblique direction as shown in FIG. 1, an angle ($\theta_1$) of a direction viewing a top portion of the printing from a viewpoint with respect to a direction perpendicular to the printing is larger than an angle ($\theta_2$) of a direction viewing a bottom portion of the printing, and a distance from characters in the top portion of the printing to the viewpoint of the reader is relatively farther than that from characters in the bottom portion of the printing to the viewpoint of the reader. According to the perspective, even though they are the characters of same size (d) in fact, the size of the characters perceived by human eyes looks smaller and smaller as going from the bottom portion to the top portion (that is, $S_1 > S_2$).

In order to get rid of this distortion of the character size, the book or newspaper may be put up so that the printing surface is perpendicular to the direction of viewing, but it is going to be very uncomfortable to keep reading the book or newspaper for an extended time period.

DETAILED DESCRIPTION OF INVENTION

Problems to Solve

The inventor, based on a situation where the book or newspaper is put almost in parallel to the horizontal plane to read, suggests to print the characters so that the sizes of characters be able to be recognized substantially same irrespective of the distances to the characters.

The invention is to provide a method for printing characters gradually larger as the distance from the reader's viewpoint increases and books and newspapers printed by said method, so that when the reader views diagonally the surface of the printing put on the horizontal plane, it has the size of characters look effectively same irrespective of the locations of characters, that is, the distances from the viewpoint, enabling to read the book or newspaper on the horizontal plane comfortably and to reduce fatigue to eyes drastically.

Also, it is another object of the invention to provide a method for displaying e-book with said printing method on an electronic book reader device.

Solutions to Problems

According to an aspect of the invention for achieving the above objects, a method for printing is provided, which is configured that the characters are printed larger and larger gradually as going from the bottom portion to the top portion of the printing surface. Here, the printing surface is an entire region of each page of a book or a region (called 'article region' below) on which an article is printed in a newspaper.

In the printing method, preferably, a longitudinal size (height) of characters at a lowest portion in the entire region of each page of the book or in an article region in the newspaper is k times larger than a longitudinal size of characters at a highest portion, and wherein a value of k is about 1.28~1.79.

Also, preferably, a horizontal size (width) of characters at the highest portion in the entire region of each page of the book or in the article region in the newspaper is k' times larger than a horizontal size (width) of characters at the lowest portion, and wherein a value of k' (a horizontal character size magnification) is about 0.7~1.0 times larger than the k (a longitudinal character size magnification).

Furthermore, a horizontal size of characters in the lowest portion of the entire region of each page of the book or the article region in the newspaper gets up to f times larger gradually as going from a central portion (C) of the lowest portion to extreme its right and left portions (R, R'), wherein a value of f is determined in a range of 1.0~1.6, and wherein the value of f decreases gradually as going from the lowest portion to the highest portion of the entire region of each page of the book or the article region in the newspaper, so that the horizontal sizes of characters in the highest portion are same in the central portion (C) and the extreme right and left portions (R, R').

Such a printing method, when viewing the printing while putting it on a horizontal surface, prints fonts or images larger and larger gradually as going from a viewpoint at a center of the printing to a top end of the printing, but prints fonts or images smaller and smaller gradually as going to a bottom end of the printing, enabling characters in a far side as well as characters in a near side to be recognized of the similar size and read comfortably, when putting on a desk and viewing diagonally the printing.

On the other hand, according to another aspect of the invention, a printing is provided, which is printed by the printing method described in the above.

The printing may be one of a paper book, a newspaper, and an electronic book.

Also, according to still another aspect of the invention, a printing method comprises steps for: a CPU's reading a document to print stored in a data storing device into a RAM; in the CPU, distributing the document to print to pages based on a predetermined size of character; in the CPU, assigning the character sizes so as to be enlarged gradually as going from the lowest portion to the highest portion; and the CPU's supplying the document to print with character sizes assigned per page to a printer, so as to be printed.

Furthermore, according to still another aspect of the invention, a method for displaying an electronic book is provided, in which when a tilting angle of the electronic book with respect to a horizontal surface of the electronic book, which is provided by a tilting angle sensor of the electronic book, falls within a specific range of angle, by applying the printing method described in the above, the characters are configured to look gradually larger as going from the lowest portion of a page displayed on a display screen of the electronic book to the highest portion.

Effects of Invention

When putting on a horizontal surface and viewing obliquely in a diagonal direction a book or newspaper printed using the invention, characters positioned in a far side as well as in a near side from human eyes are recognized of almost similar sizes. Therefore, reading can be done in a same pose, reducing fatigue to eyes and increasing concentration to reading much.

BEST MODE OF EMBODIMENTS OF INVENTION

Below, referring to the drawings, embodiments of the invention are going to be described in detail.

Figure 2:
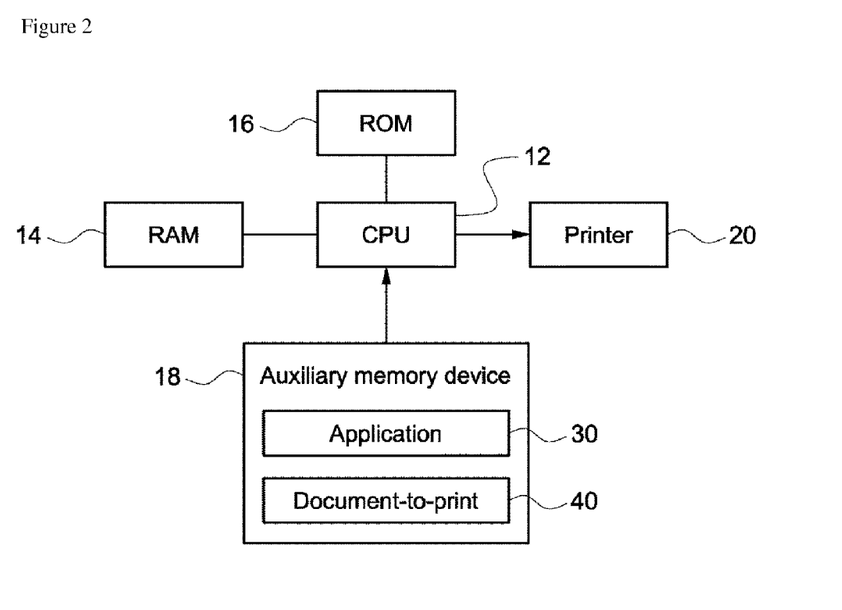
FIG. 2 is a block diagram showing a device for executing a printing method according to the invention.
Figure 3:
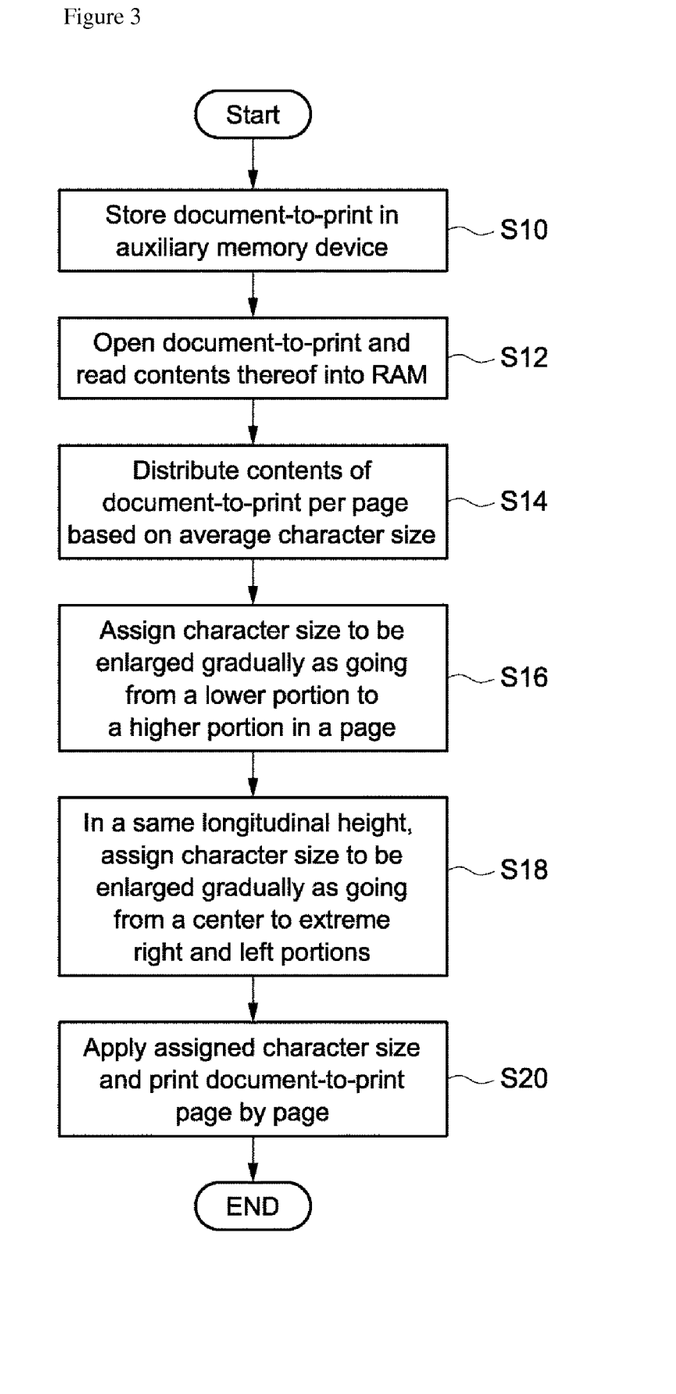
FIG. 3 is a flow chart for explaining a printing method according to the invention.

FIG. 2 shows a block diagram of a device for using a printing method according to the invention, and FIG. 3 shows a flow chart for explaining a printing method according to the invention.

Since the printing method of the invention applies a principle of varying a character size according to a character position, it can be realized as an application program (30) performing such a principle. In order to execute the printing method of the invention, as shown in FIG. 2, it is sufficient to provide hardware resources such as a general purpose computing device and a printer. That is, the application program (30) may be installed in an auxiliary memory device (18) such as a hard disk or a flash memory. And printing may be done by using components such as CPU (12), RAM (14), and ROM (16) or a computing device such as a micro-controller combining those in a single device, executing the application (30), reading a document (40) to print stored in the auxiliary memory device (18), performing a process of changing character size, and then providing to the printer (20).

Let's describe the printing method of the invention in further detail using a case of printing a book (or an electronic book) for an example. First, the application program (30) according to the invention and the document (40) to print are stored in the auxiliary memory device (18) (step S10).

If the user instructs to process the document-to-print (40) with the application program (30) in this state, the CPU (12) executes the application program (30), opens and reads the document-to-print (40) into the RAM (14) (step S12).

Then, it distributes the contents of the document-to-print (40) into pages based on the predetermined character size (12 font, for example) (step S14). When distributing (assigning) the contents of the document-to-print (40) to each page, a criterion of distributing is needed. For an example, an average size of characters printed on the same page may be used as the criterion of distributing. Before printing, using Eqs. (5) and (8) (in certain cases, including Eq. (9)), the smallest size (10 font, for example) and the largest size (14 font, for example) are determined for characters to be printed on the printing surface, and the average character size (12 font, for example) can be determined from those determined character sizes.

After assigning contents to print on each page as in the above, for each page, the sizes of characters to be printed on the page are converted and designated (step S16).

Figure 4:
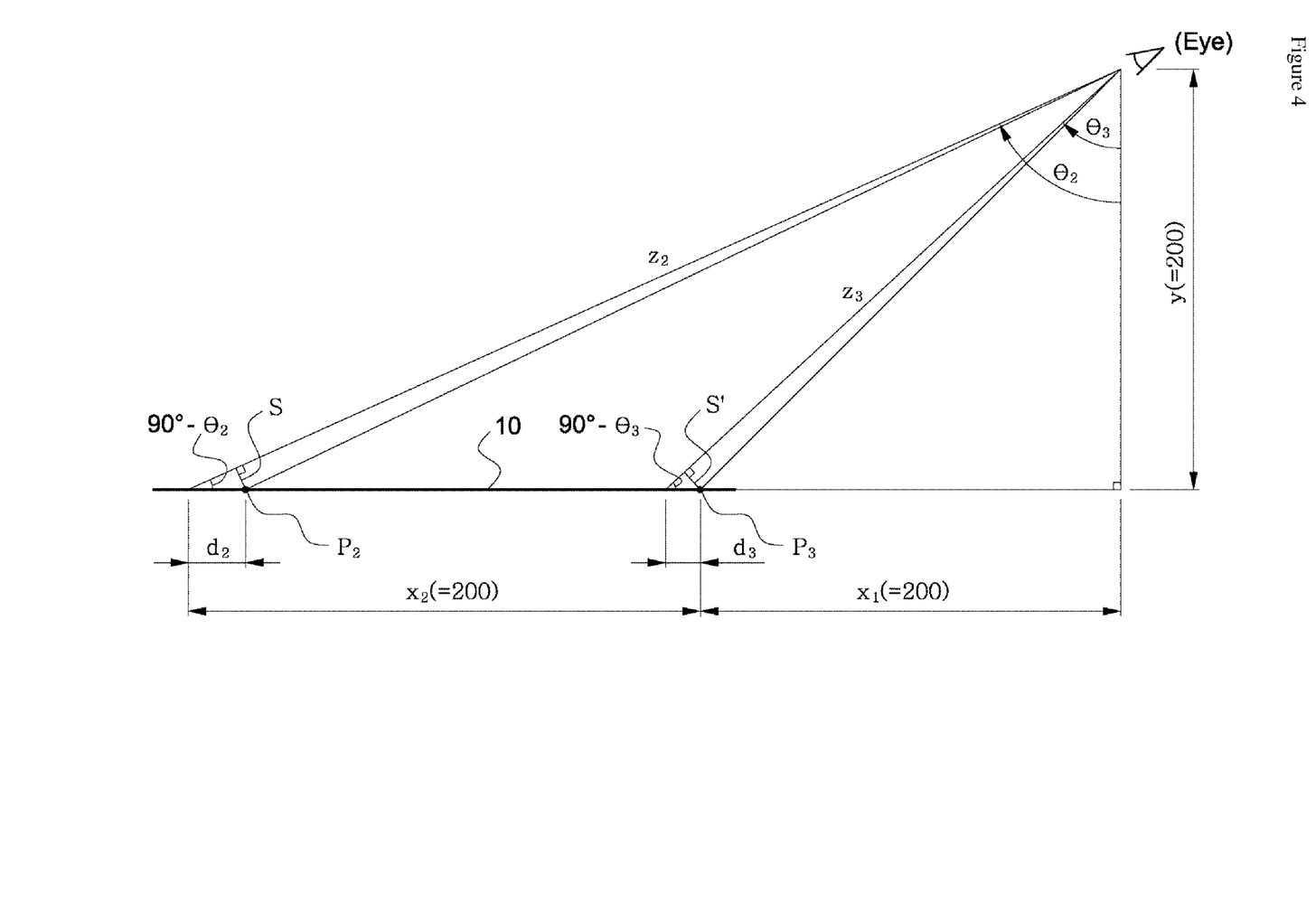
FIGS. 4 and 5 are diagrams for explaining principles of a printing method according to the invention.

First, how to convert longitudinal size of characters is described referring to FIG. 4. It is supposed that a printing (book or newspaper) (10) is set on a surface parallel to a horizontal plane, and a person views obliquely in an angle range from about $\theta_2$ to about $\theta_3$ with respect to a direction perpendicular to the horizon plane. Unlike an actual size of characters printed on the printing (10), the character size recognized by human eyes is same as the size of character printed on an imaginary plane ('virtual plane' below) perpendicular to a viewing direction. Thus, when actual longitudinal sizes of two characters printed at the highest portion and the lowest portion of the printing (10) are $d_2$ and $d_3$, let's suppose a case, in which $d_2 = kd_3$ (where, k is the ratio (the longitudinal character size magnification' below) of the longitudinal size of character printed at the highest portion of the printing to the longitudinal size of character printed at the lowest portion of the printing, and it is a real number larger than 1), and the longitudinal sizes (S) on the virtual plane of the two characters are same. This is the case, in which the longitudinal sizes of the character at the highest end (portion) and the character at the lowest end (portion) are recognized same to eyes of the person. Here, let's find the ratio of $d_2$ and $d_3$, that is, a value of k.

The cosine value of $\theta_2$, the angle between a line connecting the person's eye and the highest end point and the horizontal plane is as follows.

$$\cos\theta_2 = \frac{y}{\sqrt{(x_1+x_2)^2+y^2}} \qquad (1\text{-}1)$$

Here, y is the shortest vertical distance ('height to eyes' below) from the horizontal plane on which the printing (10) is put to the eyes of a person (reader), $x_1$ is a horizontal distance ('horizontal distance between eyes and printing' below) from a point where a vertical line from the person's eye to the plane meets the plane to the lowest character (the lowest end point $P_3$) of the printing (10), and $x_2$ is a distance from the lowest character of the printing (10) to the highest character (the highest end point $P_2$).

Approximately, $$S = d_2\cos\theta_2 = d_2\frac{y}{\sqrt{(x_1+x_2)^2+y^2}} \qquad (1\text{-}2)$$

Here, $\theta_2$ is the angle between a line connecting the person's eye and the highest end point $P_2$ and the horizontal plane.

Likewise, the cosine value of $\theta_3$, the angle between a line connecting the person's eye and the lowest end point $P_3$ and the horizontal plane, is as follows.

$$\cos\theta_3 = \frac{y}{\sqrt{x_1^2+y^2}} \qquad (2\text{-}1)$$

$$S' = d_3\cos\theta_3 = d_3 \frac{y}{\sqrt{x_1^2 + y^2}} \quad (2\text{-}2)$$

If finding a condition that S at the highest end point P$_2$ is same as S' at the lowest end point P$_3$, $$d_2 \frac{y}{\sqrt{(x_1 + x_2)^2 + y^2}} = d_3 \frac{y}{\sqrt{x_1^2 + y^2}} \quad (3)$$

That is, $$d_3 \cdot d_2 \frac{1}{\sqrt{(x_1 + x_2)^2 + y^2}} = \frac{1}{\sqrt{x_1^2 + y^2}} \quad (4)$$

Thus the value of k, the longitudinal character size magnification, is determined as follows.

$$k = \frac{\sqrt{(x_1 + x_2)^2 + y^2}}{\sqrt{x_1^2 + y^2}} \quad (5)$$

The procedure for obtaining the vertical character size magnification k was performed with the highest end point (P$_2$) and the lowest end point (P$_3$), but the points P$_3$ and P$_2$ may be also two arbitrary points on the printing (10), the above Eqs. (4) and (5) can be applied to all the points on the printing.

Figure 5:
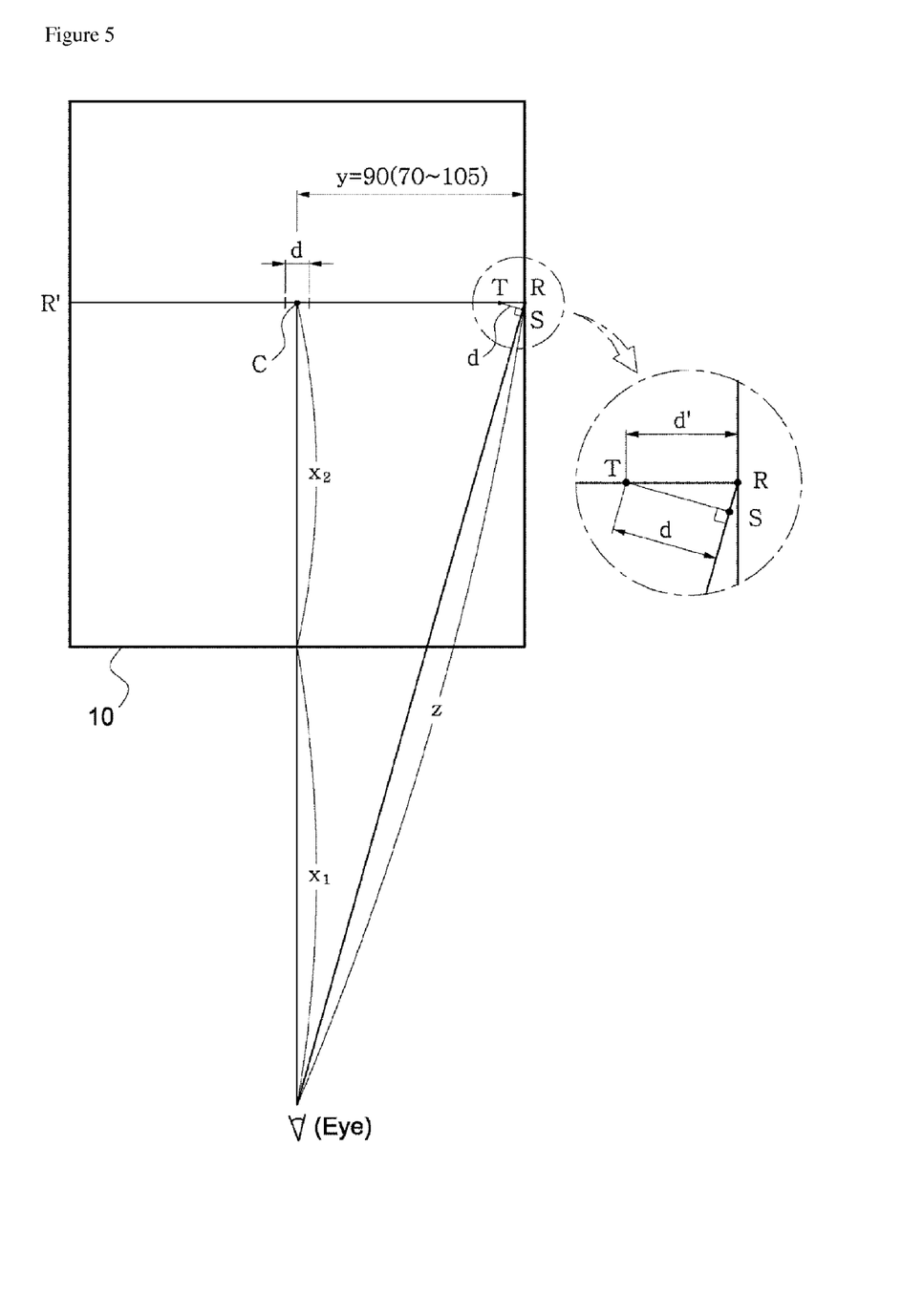

When a person views a book, the height to eyes (y) is about 150~400 mm, and the horizontal distance (x$_1$) between eyes' position and the printing (10) on the horizontal plane is about 150~350 mm (refer to FIG. 5). Using the above Eq. (5), for the printing (10) in which the longitudinal size (x$_2$) of the printing region, that is, the distance from the lowest character of the printing (10) to the highest character is 200 mm, when increasing the horizontal distance (x$_1$) between eyes' position on the horizontal plane and the printing (10) by 50 mm from 150 mm to 300 mm for each height to eyes (y) while increasing the height to eyes (y) by 50 mm from 150 mm to 400 mm, the longitudinal character size magnification k is obtained as in Table 1. That is, as going from the lowest end to the highest end, the longitudinal character size will be enlarged with a constant rate, and the longitudinal character size magnification k of characters at the highest end to characters at the lowest end will be determined in a range of about 1.28~1.79. Even though it is calculated with 300 mm instead of 200 mm for the longitudinal size of the book, the longitudinal character size magnification k is almost same. Irrespective of the size of the book used actually, the range of k is preferably about 1.28~1.79. In Table 1, the values in parenthesis are the longitudinal character size magnification k when x$_2$ is 300.

TABLE 1

| | | Longitudinal Character Size Magnification | |
|---|---|---|---|
| y [mm] | x$_1$ [mm] | x$_2$ [mm] | Longitudinal Character Size Magnification k |
| 150 | 150 | 200 (300) | 1.79 (1.79) |
| | 200 | | 1.71 |
| | 250 | | 1.63 |
| | 300 | | 1.56 |
| | 350 | | 1.50 (1.50) |
| 200 | 150 | 200 | 1.61 |
| | 200 | | 1.58 |
| | 250 | | 1.53 |
| | 300 | | 1.49 |
| | 350 | | 1.45 |
| 250 | 150 | 200 (300) | 1.48 (1.47) |
| | 200 | | 1.47 |
| | 250 | | 1.45 |
| | 300 | | 1.43 |
| | 350 | | 1.40 (1.40) |
| 300 | 150 | 200 | 1.37 |
| | 200 | | 1.39 |
| | 250 | | 1.38 |
| | 300 | | 1.37 |
| | 350 | | 1.36 |
| 350 | 150 | 200 | 1.30 |
| | 200 | | 1.32 |
| | 250 | | 1.33 |
| | 300 | | 1.32 |
| | 350 | | 1.32 |
| 400 | 150 | 200 (300) | 1.25 (1.24) |
| | 200 | | 1.27 |
| | 250 | | 1.28 |
| | 300 | | 1.28 |
| | 350 | | 1.28 (1.28) |

If only the longitudinal size (height) of characters is enlarged without enlarging the horizontal size (width) of characters, the characters are elongated and do not look good. It is preferable to enlarge the characters in the horizontal direction as well as in the longitudinal direction. In principle, it may be preferable that the horizontal character size magnification is made to be same as the longitudinal character size magnification. However, since if the horizontal character size magnification is too large, then the number of characters per line is decreased as much, it is preferable to determine the magnification that compromises such problems. According to the inventor's tests with various groups of people, it has been shown that there is no problem in looks or reading even with the horizontal character size magnification k' that is 10~30% smaller than the longitudinal character size magnification k. As a result, the horizontal character size magnification k' preferably has a value that is 0.7~1 times with respect to the longitudinal character size magnification k. If it is necessary to have more characters in a page, k' can be made small. Otherwise, it can be determined to be of a large value.

Next, considering that for a 'same longitudinal height' the perspective works in a horizontal direction so as to make both sides with respect to the center of book slightly smaller than the central portion, it is preferable to enlarge characters having the same longitudinal position (height) properly with a specific rate as going from the central portion to both sides (horizontally) (step S18). The horizontal magnification does not have to be as large as the longitudinal magnification, but let's find a precise magnification rate using FIG. 5.

In FIG. 5, in order to calculate the horizontal character size magnification f mathematically, let's suppose that the human eye points toward a central portion (C) of the printing (10) and the horizontal size of a character at a specific position of the central portion (C) is d. Here, the 'eye' of a person does not mean two real eyes, but a virtual eye (as if positioned in the middle of two eyes) that recognize and combine in the brain images from the two eyes to recognize as an object. In such a case, let's calculate mathematically how larger the characters on both extreme right and left positions must be printed than the central portion (C), in order for characters in both extreme right and left portions (R, R') in the horizontal direction from the central portion (C) to be viewed to be of the same horizontal size.

Since two triangles Δ OCR and Δ TSR are similar, the following relation is true.

$$d:d'=(x_1+x_2):z \quad (6)$$

Here, d is a horizontal character size in the central portion (C), d' a horizontal character size in both extreme right and left sides (R, R'), $x_1$ a longitudinal length from the eyes' position of the person to the lowest end of the printing (10) on the horizontal plane, $x_2$ a length from the lowest end of the printing (10) to a horizontally central portion (C) at a specific position where the size is to be found, and z the length from the eye to the extreme right and left portions (R, R1). The horizontal width of the book is about 150~210 mm, and the central value y of half of the horizontal width is about 90 mm.

At the lowest end in a longitudinal direction, let's calculate roughly how larger they have to be printed at both extreme right and left portions, in order for a reader to recognize same the character size d at the central portion and the character size d' at the both extreme right and left portions. Here, the character sizes d and d' mean the height and width of character. In such a case, since $x_2$ is 0, $$z=\sqrt{x_1^2+y^2}=\sqrt{x_1^2+90^2} \quad (7\text{-}1)$$

$$d:d'=x_1:\sqrt{x_1^2+90^2} \quad (7\text{-}2)$$

And, the horizontal character size magnification f can be obtained as follows.

$$f = \frac{d'}{d} = \frac{\sqrt{x_1^2+90^2}}{x_1} \quad (8)$$

Also, the horizontal size magnification f can be obtained at the highest end in a longitudinal direction in a similar way as follows.

$$f = \frac{d'}{d} = \frac{\sqrt{(x_1+200)^2+90^2}}{x_1+200} \quad (9)$$

For example, when $x_1$ is 150 mm, the horizontal size magnification f can be obtained by substituting the value in Eqs. (8) and (9) as follows. The f value is 1.16 at the lowest end, and 1.01 at the highest end. That is, considering enlarging the horizontal character size on both sides with respect to the central portion (C) of the book, it is preferable to enlarge the horizontal character size at the both extreme right and left portions (R, R') about 1.16 times with respect to the horizontal character size at the central portion (C) in the lowest end, but as going to the highest end the degree of magnification decreases by a constant rate, so that at the highest end the horizontal character sizes get nearly same at the central portion (C) and the both extreme right and left portions (R, R').

Figure 6:
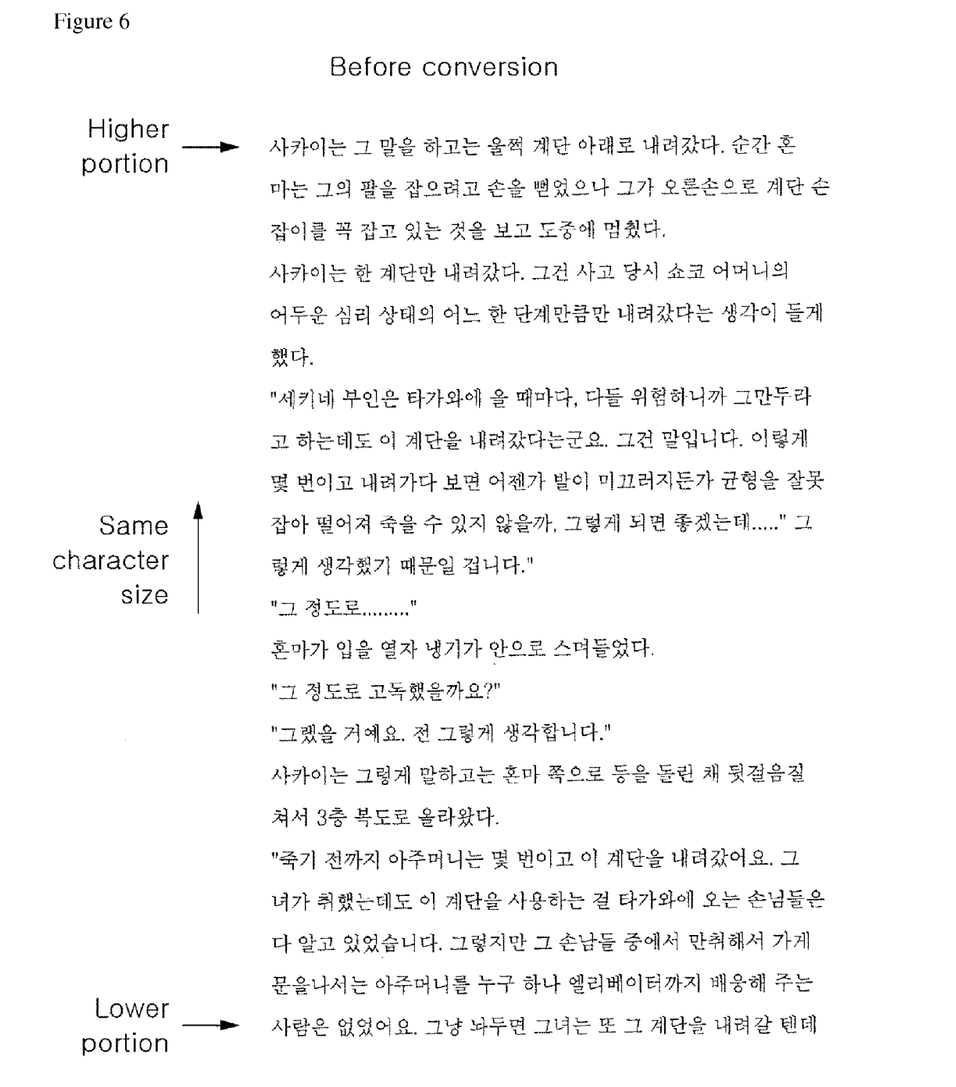
FIG. 6 is a page printed conventionally.
Figure 7:
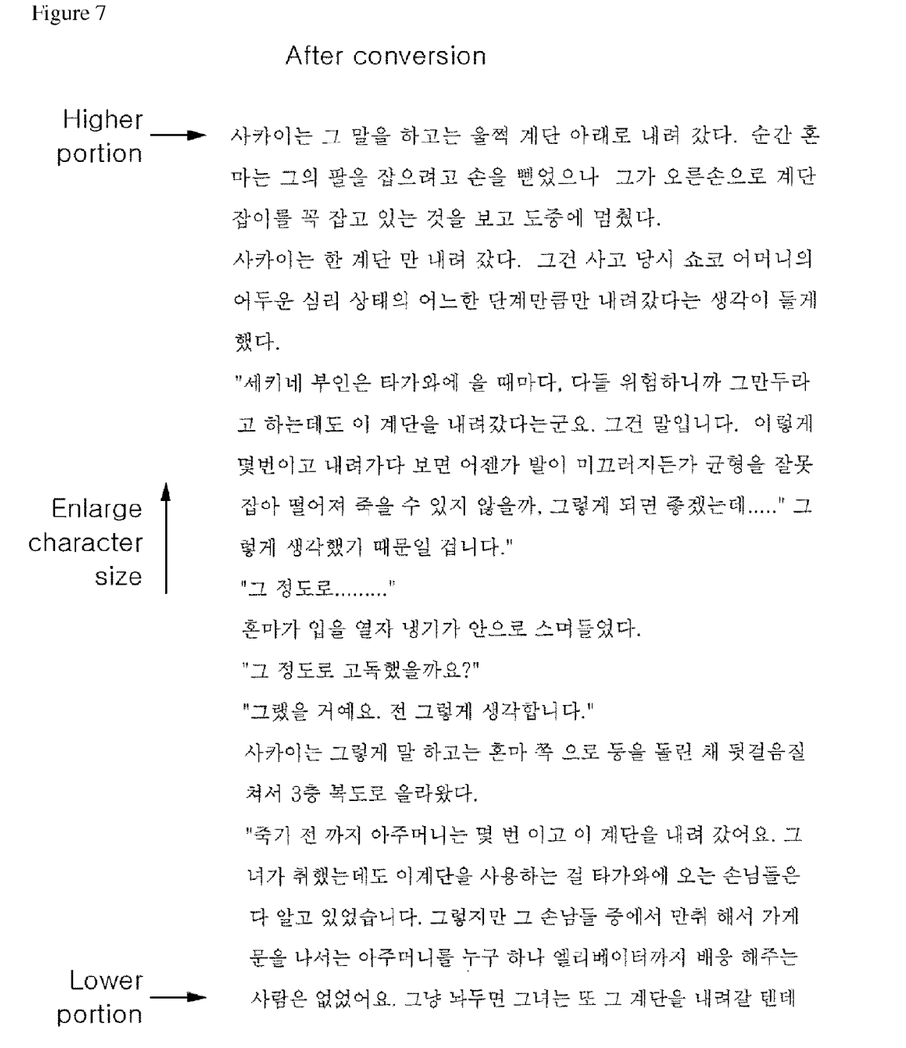
FIG. 7 is the same page as FIG. 6 printed by the present invention.

The CPU (12) adjusts and assigns the longitudinal and horizontal character sizes (height and width) according to the positions of the characters as shown in the above, and then divides the contents to print page by page and send them to the printer (20) along with the information on the assigned character sizes (step S18). For example, if determining the longitudinal character size (height of character) to be 4 mm, for example, at the lowest end and the value k, longitudinal character size magnification, to be 1.6 for example, then the longitudinal character size at the highest end is 6.4 mm (=4 mm×1.6), and therefore as going from the lowest end to the highest end of the printing surface (page), the longitudinal character size (height of character) may be assigned so as to be enlarged gradually from 4 mm to 6.4 mm. The same is true for the horizontal character size. If determining the ratio of the horizontal character size magnification k' to the longitudinal character size magnification k to be 0.9 for example, then the horizontal character size magnification k' is calculated to be 1.44 (=1.6×0.9). And since if determining the horizontal size (character width) to be 3.6 mm for example, then the horizontal size (character width) at the highest end is calculated to be 5.18 mm (=3.16×1.44), the horizontal character size (character width) can be assigned so as to be enlarged gradually from 3.6 mm to 5.18 mm as going from the lowest end to the highest end. The character size of characters in a same horizontal line (same longitudinal height) may be enlarged gradually as going horizontally from the center of the line to both sides, and here the ratio f of the character size d' in both extreme right and left portions to the character size d at the center of the same line is same as Eq. (8) at the lowest end of the printing (10), and as Eq. (9) at the highest end. For example, when the value $x_1$ is 150 mm, since f is 1.16 at the lowest end and calculated to be 1.01 at the highest end, the value f at each horizontal line is determined for the each horizontal line so as to decrease gradually from 1.16 to 1.01, and sizes of characters at each horizontal line can be adjusted using the value. The printer (20) receives data from the CPU (12) and prints them. FIG. 6 shows an example of printing one page of contents horizontally and conventionally without applying the method of converting character size according to the invention (of course, the invention can be applied to a case of longitudinal printing), and FIG. 7 shows an example of printing through applying the method of converting character size according to the invention (but, step S18 was not applied). In the printing in FIG. 7, it can be seen that the longitudinal and horizontal character sizes are enlarged gradually as going from the lowest portion to the highest portion. If viewing the printing diagonally, the characters at the lower portion and the higher portion look of almost the same size, and can be read comfortably in a same posture. In contrast, when reading the printing in FIG. 6 in the same way, the characters at the top portion look smaller, and the reader is forced to go forward to read that portion.

The above printing methods may be configured to be realized as an application program (30) and executed in a computing device. The computing devices may be a general-purpose computer, printing computer, electronic book devices, etc.

Even though the printing method of the invention was described using a case of printing a book (here, the book includes a collection of several printings or a printing bound as a single volume) in the above, the similar method can be applied to printing of newspaper based on the above description. In order to apply the invention to printing of newspaper, each article of newspaper may seem to correspond to a page of a book. That is, since an article is positioned longitudinally over one or more article-rows, irrespective of position of the article-row, the longitudinal and horizontal sizes of character may be printed gradually larger as going from the lowest end to the highest end of the article. In a case of newspaper, since the amount of information (characters) to be contained in a same surface is more important compared to the book, it will be preferable to apply relatively smaller size magnification than in the book. Further, it would be more effective in containing more amount of information to concentrate more on enlarging the longitudinal character size magnification rather than the horizontal character size magnification. For a same reason, the step S18 in FIG. 3 may be considered not to apply.

Printing in the invention includes electronic books displayed on an e-book reader. Therefore, printing in the invention includes the concept of displaying characters in an e-book on a screen. In the case of e-book, it is preferable to decide whether the invention should be applied or not based on angles between the display screen and the reader's viewing direction. For example, it is preferable not to apply the invention if the viewing direction is perpendicular to the display screen, but it is preferable to apply the invention to displaying the e-book pages when the display screen is tilted with respect to the viewing direction (the tilting angle may be detected using a tilting angle detector installed in the e-book device). Here, the display screen of the e-book can be considered as the printing (10) and the principles of the invention described above can be applied there.

The descriptions about the invention in the above are just embodiments of the invention. One skilled in the field of arts may change and modify the invention variously without leaving the spirit and scope of the invention claimed in the claims below. Therefore, all the changes that are equivalent or inclusive to the claims of the invention belong to the scope of the invention.

INDUSTRIAL APPLICATIONS

The invention may be applied to books and newspapers. Furthermore, it can be applied to all kinds of printings.

Also, it can be applied to displaying an e-book on an e-book reader.

Furthermore, the invention may be applied to a large-scaled billboard, which is supposed to be looked or viewed up from below. Therefore, the printings include such bill boards.

The invention claimed is:

1. A method for printing a book, the method comprising steps for:
   a CPU's reading a document to print stored in a data storing device into a RAM;
   in the CPU, distributing the document to print to pages based on a predetermined size of character;
   in the CPU, in order to make a visible size difference of all characters printed on a printing surface recognized to be minimal when a reader reads the characters on the printing surface while a viewing direction of the reader is tilted from the printing surface, enlarging a longitudinal size (that is, a height) or the longitudinal size and a horizontal size (that is, a width) of the characters on a same page gradually as going from a lowest portion to a highest portion of the printing surface; and
   the CPU's supplying the document to print with character sizes assigned in the enlarging step per page to a printer, so as to be printed,
   wherein the longitudinal size of the characters at the highest portion in the entire region of each page of the book is k times larger than the longitudinal size of the characters at the lowest portion, and wherein a value of k is about 1.28~1.79, and
   wherein the horizontal size of the characters at the highest portion in the entire region of each page of the book is k' times larger than the horizontal size of the characters at the lowest portion, and wherein a value of k' (a horizontal character size magnification) has a value that is 0.7~1.0 times with respect to the k (the longitudinal character size magnification).

2. The printing method of claim 1, wherein the horizontal size of the characters gets up to f times larger gradually as going from a central portion (C) to extreme right and left portions (R, R') in the lowest portion of the entire region of each page of the book, wherein a value of f is determined in a range of 1.0~1.16, and wherein the value of f decreases gradually as going from the lowest portion to the highest portion of the entire region, so that the horizontal size of the characters in the highest portion are same in the central portion (C) and the extreme right and left portions (R, R').

* * * * *